United States Patent Office 3,776,989
Patented Dec. 4, 1973

3,776,989
METHOD FOR INJECTION MOLDING ARTICLES OF FOAM MATERIAL INVOLVING AUTOGENOUS FLOW
Rupert E. Annis, Jr., Salem, and William T. Kyritsis, Beverly Farms, Mass., assignors to USM Corporation, Boston, Mass.
Continuation-in-part of application Ser. No. 886,485, Dec. 19, 1969, which is a continuation-in-part of application Ser. No. 644,886, June 9, 1967, both now abandoned. This application May 8, 1972, Ser. No. 250,932
Int. Cl. B29b 3/00; B29d 27/00; B29f 1/08
U.S. Cl. 264—53                           7 Claims

ABSTRACT OF THE DISCLOSURE

A process of molding articles of foam material comprising forming a mixture of organic polymeric resin material and a blowing agent in a chamber at a temperature below the foaming temperature of the resin-blowing agent system and forcing the mixture through a restriction for resisting the flow of the material to impart heat to the material, the heat imparted being of a magnitude sufficient to raise the temperature of the mixture to the foaming temperature, and discharging the mixture, at its foaming temperature, into a mold cavity.

BACKGROUND OF THE INVENTION

This is a continuation-in-part of our application Ser. No. 886,485, filed Dec. 19, 1969, which is a continuation-in-part of application Ser. No. 644,886, filed June 9, 1967, and both now abandoned.

This invention relates to injection molding and is directed more particularly to a process for the molding of articles of foam material.

DESCRIPTION OF THE PRIOR ART

The injection molding of foam materials is generally accomplished by melting a mixture of a foamable material and a blowing agent at a temperature sufficient to cause foaming but at a pressure above the foamable pressure of the mixture so that the mixture is prevented from foaming. Pressure is maintained on the mixture until it is delivered to a mold assembly where, upon release of the pressure, the mixture expands and fills the mold cavity.

A difficulty experienced with the above method stems from the fact that the mixture expands instantaneously with the release of pressure. Generally, expansion has taken place to a very substantial degree before the mixture is inside the mold cavity, as for example, in the conduit connecting the mold assembly and the mixture melting means.

Accumulation chambers have been used intermediate the melting means, which is usually a screw type plasticator, and the mold assembly. In the accumulation chamber the mixture is maintained at a pressure above the foaming pressure until the chamber is opened for ejection of the mixture, as by a piston, into a conduit leading to the mold cavity. Experience has shown that, absent rather high pressure, undesirable foaming takes place in the accumulation chamber and that at any rate, as soon as the mixture is pushed out of the chamber the mixture immediately foams.

Foaming of the material prior to its being in the mold cavity usually results in rather low quality surface finish and cell structure in the molded article. Since the surface of the molded article is formed by the compacting of the existing foam cells against the mold wall, the resultant article often has coarse surface skin, inferior to conventionally molded solid plastic and limited in use to application where less attractive surface appearances are acceptable. Techniques such as, utilizing high density foam and/or heating of the mold yields only limited improvement at considerable cost to the molded article owing to increased weight or substantially longer cycle times.

SUMMARY OF THE INVENTION

It is an object of the present invention to provide a process of injection molding articles of foamed material wherein the foamable mixture is maintained in a substantially non-foamed condition until it enters the mold cavity.

A further object of the invention is to provide such a process in which the foamable mixture need not be maintained at a high pressure in order to minimize premature foaming.

A still further object of the invention is to provide such a process in which the foaming of the foamable material is controlled by temperature rather than pressure.

With the above and other objects in view, as will hereinafter appear, the present invention in one aspect thereof contemplates a process of molding foamed material articles comprising the steps of forming a molten mixture of organic polymeric resin material and a blowing agent in a chamber at a temperature below the foaming temperature of the blowing agent, and forcing the resulting molten mixture into a discharge channel having means to cause resistance to flow of the molten mixture, and imparting of heat to the mixture as it is forced through the channel. The heat imparted to the mixture is of a magnitude sufficient to raise the temperature of the molten mixture rapidly to its foaming temperature, whereby to initiate expansion of the mixture. Communication between the channel and a mold assembly is then established and the molten mixture introduced into the mold cavity where the expansion of the mixture takes place.

The above and other features of the invention will now be more particularly described with reference to the accompanying drawings and pointed out in the claims. It will be understood that the particular device employed to illustrate utilization of the invention is shown by way of illustration only and not as a limitation of the invention. The principles and features of the invention may be employed in various and numerous embodiments without departing from the scope of the invention.

BRIEF DESCRIPTION OF THE DRAWINGS

Reference is made to the accompanying drawings in which there is shown an illustrative embodiment of apparatus which may be used in the practice of the present invention.

DESCRIPTION OF THE PREFERRED EMBODIMENTS

Figure 1:
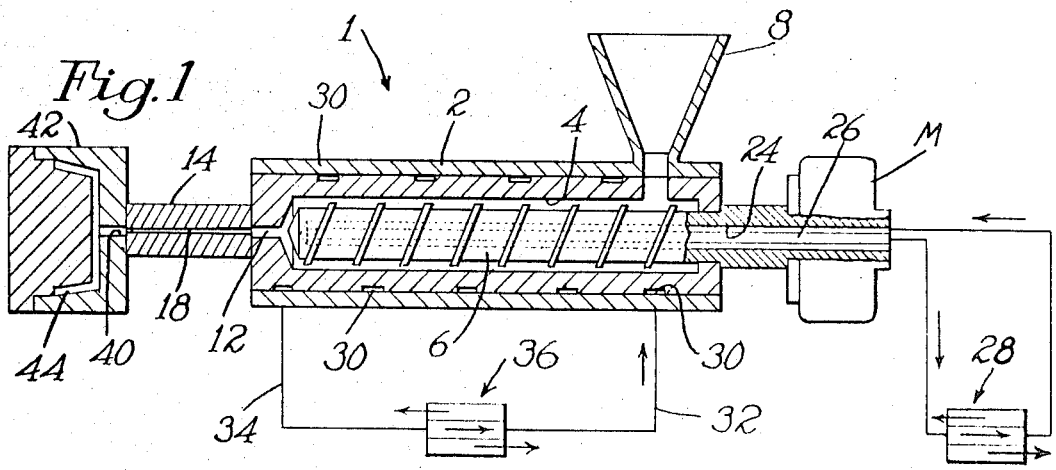
FIG. 1 is a longitudinal elevational and partially sectional view of one form of plasticator and mold assembly arrangement, in elementary form; which may conveniently be employed in the practice of this invention, the section being taken along the center line of the plasticator housing; certain temperature control means are shown diagrammatically.

Referring to FIG. 1, it may be seen that the illustrative apparatus includes a plasticator 1 comprising a plasticator housing 2 having an elongated cavity 4 in which is disposed a plasticator screw 6. The plasticator screw 6 is rotatable by a motor M. A feed hopper 8 is attached to the plasticator housing 2 for admitting injection molding material, usually in pellet form, to the plasticator 6. At the end of the plasticator housing remote from the feed hopper 8 there is located a nozzle passage 12 for the transferral of plasticated material from the cavity 4 of the plasticator. A channel block 14 is attached to the plasticator housing 2 and includes a relatively long channel 18 having a relatively small diameter. The channel 18 is in alignment with the nozzle passage 12 and serves to impart heat, as by frictional resistance, to material forced therethrough, as will be further described below. The nozzle passage 12 and/or the channel block 14 may be provided with discharge valves 20, 22 (see FIGS. 2 and 3) for terminating flow through the discharge channel 18.

The illustrated embodiments shown in FIGS. 2 and 3, as well as the function and operation of the valves 20 and 22, will be described in more detail hereinafter.

Referring again to FIG. 1, it will be seen that the plasticator screw 6 is provided with an axial bore 24 having disposed therein a cooling tube 26. A cooling or heat transfer medium is transmitted by means not shown, but well known in the art, to the bore 24 where it operates to cool the plasticator screw 6. After traveling the length of the bore 24, the cooling medium enters one end of the tube 26, the left end as shown in FIG. 1, from whence it is transmitted to a cooling means, diagrammatically shown in FIG. 1 and indicated by numeral 28. As is known in the art, means (not shown) are provided for regulating the temperature of the coolant.

The plasticator housing is provided with a cooling channel 30 which receives a cooling or heat transfer medium by means of an inlet 32. After the coolant is circulated through the length of the spiral cooling channel 30 so as to cool the plasticator housing, the coolant is discharged through an outlet 34 which carries the coolant to a cooling means shown diagrammatically in FIG. 1 and indicated by the numeral 36. As with the cooling means 28, the cooling means 36 is provided with temperature control means which are not shown but are known in the art.

Alternatively, the temperature of material in the plasticator may be controlled by conventional thermostatic control means employed to control the amount of heat transferred to the material. Further, the heat transfer means may be utilized to heat the material if desired.

In operation, a selected injection molding material, mixed with an appropriate blowing agent, is placed in the feed hopper 8 from which the mixture moves, as by gravity, to the receiving end of the plasticator housing (the right hand end shown in FIG. 1). The plasticator 6 rotates within the plasticator housing cavity 4 and plasticates the mixture from the feed hopper 8.

Any of the heat softenable organic polymeric resinous materials commonly processed by injection molding to form foamed articles may be treated according to the present process. That is, any polymer resin composition that has the heat stability at the temperature needed to bring it to fluid state with a viscosity suitable for injection molding, and the ability to set up to a solid state after molding and cooling, can be foam molded by the present process. Thus, the applicants have molded polyethylenes, polypropylenes, ethylene-propylene copolymers, ethylene-vinyl acetate copolymers, polystyrenes including "impact" polystyrenes, polyamides, polyacetals, polycarbonates, polymers of vinyl chloride, copolymers of vinyl chloride with other monomers such as, styrene, polyurethanes, resins such as ethyl cellulose, copolymers of acrylonitrile with other monmers such as, styrene, polyurethanes, natural rubbers, synthetic polymer rubbers such as, polychloroprene and synthetic copolymer rubbers such as, copolymers of butadiene and styrene, terpolymers of butadiene and styrene, and acrylonitrile, "A stage" phenolic resins and epoxy resins, and other materials.

Viscosity of a resin or the inverse of viscosity, namely, fluidity, at a given temperature is, of course, dependent on the molecular weight or degree of cross linking. One measure of the fluidity of resins at elevated temperature is "melt index," i.e., the quantity of resin which will flow through a standard orifice under specified conditions. Another measure is "melt viscosity" which may be determined by a viscosimeter. The melt index range, or the flow-, or melt-viscosity ranges within which resins are useful for foam molding by the present process are essentially the ranges for resins used in molding unfoamed resins. It is noted that values of these factors in resins successfully foam molded range from a melt index of 30 for a polyamide (Zytel 211) to 0.2 for a polypropylene. Accordingly, the melt index or flow-, or melt-viscosity of the resin, while a matter to be considered in determining operating conditions such as temperature and pressure, is not a limiting factor in the selection of resins for foam molding.

The foaming temperature, i.e., the temperature of the resin blowing agent composition as it enters the mold is selected to insure that the resin is in the viscous flow range, and this temperature depends on the particular resin blowing agent composition to be molded. Factors controlling the temperature required are the need to use a high enough temperature to give a fluidity high enough temperature to give a fluidity high enough to avoid undue restriction on the degree of expansion, to insure filling of the mold with the capabilities of the injection molding equipment used, to allow flow of the resin into engagement with mold surfaces to reproduce fine detail of mold and also high enough to maintain sufficient fluidity of the resin in the mold to avoid weld lines. On the other hand, the upper limit of temperature is determined in part by the practical factor that hotter bodies of resin take longer to cool and solidify for removal from the mold. Also, there is a loss of quality if the resin remains fluid for a long period due to increased time for the merger of blowing bubbles to form a coarser cell structure. In practice, the temperatures recommended by resin manufacturers for straight injection molding are usable in the present injection foam molding process.

In this connection, calculation of temperature to be used for foaming from viscosity-temperature relationships separately determined for a selected resin, is a possibility; but in every case, the heat history, shear rate, flow rate, conformity or non-conformity with Newtonian flow and other factors are different for each injection molding machine, shot size and mold shape. Accordingly, selections of the temperature at which the material is to enter the mold is made by making a trial run at a temperature in the range recommended by the resin manufacturer and by known corrections after examination of the molded article.

An example of how these corrections are applied in molding solid polypropylene is given on pages 112 to 116 of "Polypropylene" by H. P. Frank, published 1968 by Gordon and Breach Science Publishers, 150 5th Avenue, New York. Referring to Table 6.4 on page 114, it will be seen that increasing the temperature increases shrinkage, sinks and voids and decreases warpage, gives improved surface and reduces short shot problems. The effects of increasing pressure, mold temperature, injection time, cure time and gate size are also given.

Factors peculiar to foaming resin compositions are discussed in an article by Gillette entitled "The Rheology of Thermoplastics Containing Chemical Blowing Agents" RETEC, SPE, Palisades Section, November 1964, pages 41 to 45. That article points out that the density of foamed polymer resins depends on the melt viscosity of the resin when foaming at a given temperature, lower melt viscosities giving lower density. A further factor affecting expansion is the shear rate developed in polymer resin-blowing agent compositions. At a fixed blowing agent level an increase in shear rate causes density decrease.

For a selected resin molding composition and using a processing temperature in the range suggested for that resin remaining factors to be coordinated for practice of the process include selection of blowing agent, plasticating control to reach a determined preinjection temperature, injection rate and the dimensions of the restricted cross section passageway leading to the mold cavity.

Plastication of the injection molding material causes the temperature of the material to rise sharply and the injection molding material to become molten. To prevent reaching the foaming temperature of the blowing agent in the plasticator housing, coolants may be forced through the cooling channel 30 in plasticator housing 2 and through the bore 24 in the plasticator screw 6. As noted above, thermostatic means may alternatively be utilized to control the temperature which the mixture of molding material and blowing agent attains in the plastication step. Upon reaching the discharge end of the plasticator (the left hand end as viewed in FIG. 1), the molten mixture enters the nozzle passage 12 and thereafter the discharge channel 18.

The discharge channel 18 is relatively elongated in length and of reduced diameter. The length of the channel 18 and its diameter cooperatively resist the flow of molten material therethrough by frictional resistance. The molten mixture, however, is forced through the channel 18 by the continued rotation of the plasticator 6 which acts as a screw pump.

Means, such as for example, those described in U.S. Pat. No. 3,006,032, issued Oct. 31, 1961, upon application of W. L. Baker et al., are employed to connect the discharge passage 18 to a sprue channel 40 located in a mold assembly 42 and in communication with a mold cavity 44. The molten mixture from the channel 18 proceeds through the sprue channel 40 into the mold cavity 44. When the mold cavity is filled, a cut-off device, such as that described in U.S. Pat. No. 3,299,476, issued Jan. 24, 1967, upon application of D. B. McIlvin, operates to terminate further pumping by the plasticator.

During the injection molding operation, the heat imparted by frictional resistance in the discharge passage 18 to the molten mixture must be of a magnitude sufficient to raise the temperature of the mixture to the foaming temperature of the blowing agent mixture.

While the discharge channel block 14 may be an integral part of the plasticator housing 2, it is preferable that it be a separate unit so that only the discharge block 14 need be changed when there is a change in the mixture used such as to necessitate a smaller or larger diameter channel.

Figure 2:
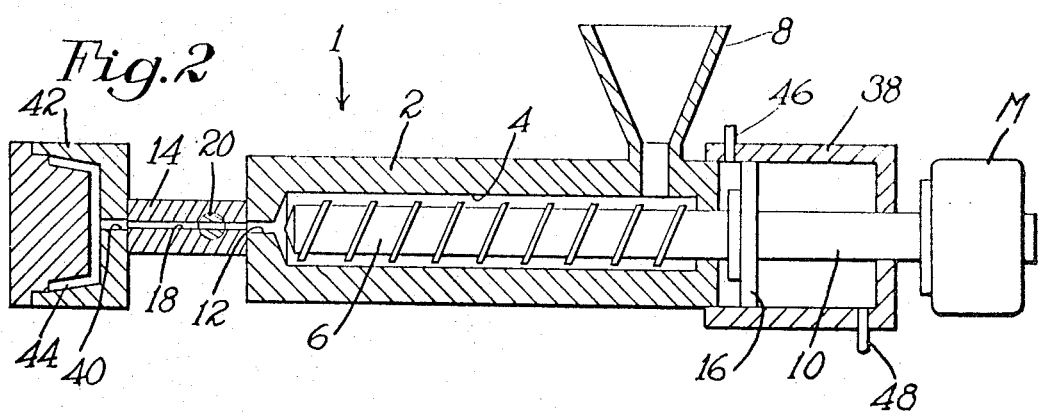
FIG. 2 is a longitudinal elevational and partially sectional view of another form of plasticator and mold assembly arrangement in elementary form for use in the practice of this invention.

Referring to FIG. 2, it will be seen that another embodiment of apparatus which may conveniently be used to practice the present invention comprises an apparatus similar to that shown in FIG. 1, but in which the plasticator screw 6 reciprocates in the plasticator chamber 4. To facilitate the reciprocating movement of the plasticator screw 6 the plasticator is provided with an extension 10 having a piston 16 mounted thereon. The piston 16 is disposed in a cylinder 38 having fluid conduits 46 and 48. By means known in the art the plasticator screw 6 is caused by the motor M to rotate in the chamber 4 and at the proper moment in a cycle of operation to be moved in accordance with fluid pressures in the cylinder 38 from right to left as viewed in FIG. 2, so as to force a quantity of molten material from the chamber 4 and through the nozzle passage 12.

Similarly to the apparatus shown in FIG. 1, the apparatus of FIG. 2 is provided with a channel block 14 having a discharge channel 18 which connects with the inlet 40 of a mold assembly 42. In this embodiment the channel block 14 with channel 18 serves the same purpose as the channel block 14 of the embodiment of FIG. 1. The length and diameter of the discharge channel 18 is selected so as to impart sufficient heat to the molten material forced therethrough by the reciprocation of the plasticator screw 6 to raise the temperature of the material to the foaming temperature. Although not shown in FIG. 2, the reciprocating screw embodiment may include temperature control means for the plasticator screw 6 and plasticator housing 2 substantially the same as that shown in FIG. 1.

Figure 3:
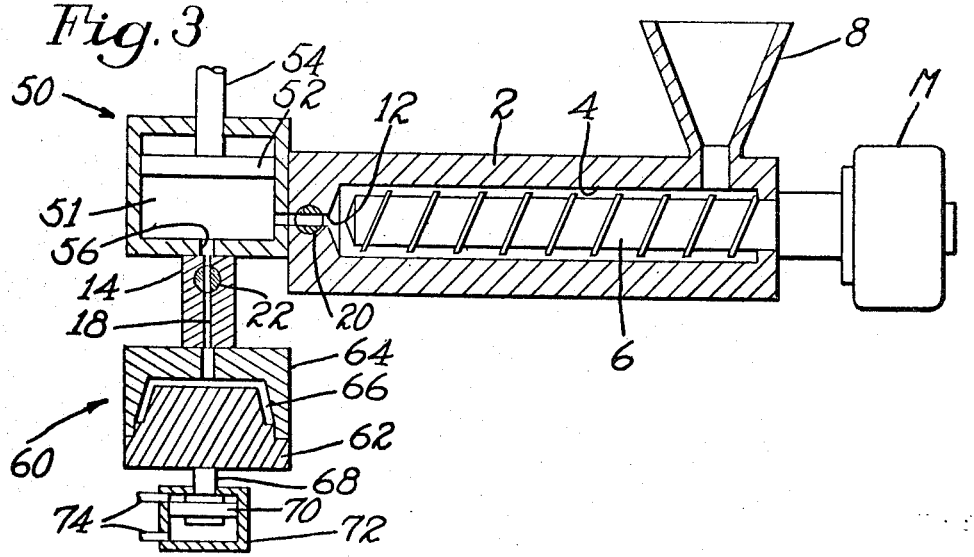
FIG. 3 is a longitudinal elevational and partially sectional view of still another form of plasticator and mold assembly arrangement in elementary form for use in the practice of this invention.

Referring to FIG. 3, it will be seen that a still further embodiment includes a single action pump 50 having a chamber 51 which receives molten material from a plasticator 1 having a plasticator screw 6 which is rotated by a motor M. Again, as in the embodiments shown in FIGS. 1 and 2, the injection molding material worked by the plasticator screw 6 is maintained at a temperature below foaming temperature of the blowing agent molding composition used, preferably by cooling means as shown in FIG. 1. Thus, the molten injection material enters the pump 50 at a temperature below the foaming temperature. As the material enters the pump 50 it causes a piston 52 and piston 54 to move upwardly, as viewed in FIG. 3. By means known in the art, such as that shown in U.S. Letters Pat. No. 3,006,032 issued Oct. 31, 1961, on application of W. L. Baker et al., when the piston 52 has risen to a point selected in accordance with the volume of molten material desired in the pump, the plasticator screw 6 is stopped and/or the valve 20 is closed and the piston 52 caused to move downwardly.

Apparatus used in the practice of the present invention has a channel block 14, having a discharge channel 18, attached to the pump 50 with the channel 18 in alignment with a pump discharge nozzle 56. The valve 22 disposed in the channel block 14 is preferable in this embodiment and is moved to the open position automatically by means not shown, but known in the art, as the piston 52 starts its travel downwardly.

Downward movement of the piston 52 forces the molten material therein out the nozzle 56 and into the channel 18. As in the embodiments shown in FIGS. 1 and 2, the channel 18 is sufficiently elongated and of restricted diameter so that the length and diameter, by frictional resistance to flow, impart enough heat to the mixture forced therethrough to raise the temperature of the mixture to the foaming temperature whereby to initiate the foaming action.

It has been found to be advantageous to provide a mold assembly having means for enlarging the mold cavity after the cavity is filled with molding material. Such a mold assembly 60 is illustrated in FIG. 3 but is applicable to all three embodiments shown.

Referring to FIG. 3, it will be seen that the illustrative mold assembly 60 includes a mold member 62 which may be moved relative to the remainder of the mold assembly 64 without opening the mold cavity 66 formed by the mold members 62, 64. Means for moving the mold member 62 may comprise a piston rod 68 interconnecting the member 62 and a piston 70 located in a cylinder 72. Conduits 74 permit the entrance and escape of fluid for controlling the movements of the piston 70 in the cylinder 72 and thereby the movement of the mold member 62 in the mold assembly 60.

In operation, the mold member moving means is controlled automatically by means (not shown) responsive to filling of the mold or responsive to the completion of the downward movement of the piston 52 in the pump 50, so that after the mold is filled, the member 62 moves in a direction outwardly from the mold member 64 whereby to enlarge the mold cavity and permit expansion of the mixture therein, the mixture having previously been placed in condition for expansion by its having reached the foaming temperature of the blowing agent molding composition mixture in the channel 18 of the block 14.

As an alternative to the relatively long and relatively small diameter channel 18 in the discharge channel block 14, there may be utilized a channel of shorter length and larger diameter, but having means located therein for imparting frictional heat to the molten material passing therethrough. An arrangement of flow retarding vanes have been found to accomplish substantially the same result. However, from a manufacturing standpoint the small diameter channel is preferable.

As used herein, the term "foaming temperature" means that predetermined range of temperature for a particular combination of organic polymeric material and blowing agent at which the foaming process will produce a foam structure having a desired or preferred character. If expansion takes place above the predetermined foaming temperature, the cells in the first position of the material entering the mold will be too large (and may even burst) and the molded article will have uneven cell size, internal voids and poor surface finish. If expansion takes place below the predetermined foaming temperature, unsatisfactory mold filling, and inadequate or incomplete blowing will result.

Selections of blowing agents for combination with particular resins has been analyzed in articles in "Modern Plastics Encyclopedia," 1966, pp. 394 to 401 and "Plastics Progress," 1955, pp. 53 to 56, and 70 to 77.

As there discussed, chemical blowing agents must be matched to the processing characteristics of the polymer resin to be formed in accordance with known principles. The temperature range for foaming is that at which the viscosity of the molten resin is high enough to retain the liberated gas but not so high as to unduly restrict expansion. Low temperature decomposing blowing agents must be used with low temperature processing polymers, since such agents would reach the foaming temperature in the plasticator and develop undesired amounts of gas which would form coarse cells and poor molded part surface finish if used with high temperature processing polymer. Conversely, high temperature decomposing blowing agents if used with low temperature processing polymers, will give unblown or inadequately blown products.

In the present process, there is the further requirement for selection of chemical blowing agents that they be stable to the point of not generating undesired blowing gas during the time they are held at temperatures sufficiently high to allow plastication of the polymer resin where the temperature reached before the resin is forced through the restricted cross section passageway plus the temperature added in flowing through the passageway will result in attaining the foaming temperature. The decomposition temperature and the rates of decomposition of a number of blowing agents are shown in an article entitled, "Production of Fine Cells in the Extrusion of Foams" by Hansen, pp. 77 to 82, particularly pp. 80 and 81 of "SPE Journal" vol. 18, No. 1 of January 1962. Additional information on the thermal decomposition behavior of blowing agents is given on pp. 532 to 565 of "Encyclopedia of Polymer Science and Technology," vol. 2, published 1965, by John Wiley and Sons. In use of data on decomposition behavior of blowing agents, it must be kept in mind that the medium surrounding the blowing agent affects the temperature and rate at which the blowing agent decomposes to generate blowing gas. Thus, it is known that the temperature and rate of decomposition in the presence of phosphate plasticizers is different than the temperature and rate in air. Accordingly, temperatures are selected with respect to a polymer-blowing agent system rather than with respect to the blowing agent alone. Included among blowing agents which may be used in the present process are the following. The numbers in brackets following each blowing agent being the decomposition temperature of the agent in air. P,p'-oxybis (benzene sulfonyl hydrazine) (315°–320° F.), azodicarbonamide (385°–390° F.), p-toluene sulfonyl semicarbazide (455°–460° F.), trihydrazinotriazine (525° F.), "AZO–CH"-hydrazine derivative (480° F.), "AZO–CW"-hydrazine derivative (410° F.) and modified trihydrazinotriazine from Fisons, England, in styrene acrylonitrile copolymers (480° F..)

The "SPE Journal" article discusses the mechanism of bubble formation in considerable detail. The procedures there discussed include one in which major decomposition of chemical blowing agents occurs in the extruder barrel under conditions such that some of the chemical blowing agent leaves the extruder barrel undecomposed so that particles of undecomposed chemical blowing agent serve as nucleating particles as well as generating additional blowing gas. The behavior is shown in FIG. 3 on page 79 of the article which also suggests that fine particles may be included in the resin composition to improve the development of fine uniformly dispersed bubbles rather than the development of large irregularly distributed bubbles and loss of blowing gas which would occur without such nucleating particles.

Matching of blowing agents with polymer resin and selection of that temperature most satisfactory to form a well-foamed resin following the teachings of the present invention is thus a matter within the skill of the art.

During the molding operation the molten mixture is caused to reach the "foaming temperature" of the blowing agent-polymer resin system by the frictional heat imparted to the molten mixture as it is forced through the discharge channel. Upon reaching the foaming temperature, foaming of the mixture does not immediately take place. Although foaming is initiated when the mixture reaches the foaming temperature, there is a slight delay, which may be of the order of one to six seconds, before substantial expansion of the mixture transpires. Accordingly, the mixture is generally disposed in the mold cavity when substantial expansion occurs. It has been found that where delay of expansion of mold material until the material is in the mold cavity is possible, a better quality molded foam article results. Accordingly, inasmuch as the present method permits delay of the expansion of the foam material until after the foam material has been injected into the mold cavity, it facilitates the manufacture of superior molded foam products.

A further advantage which may be secured according to the present invention lies in the combination of at least two factors of which the first is forming a molten mixture of blowing agent and resin under temperature conditions which are (a) a time-temperature value below the time-temperature value at which the selected blowing agent liberates undesired gas where the agent is one which liberates gas by decomposition or with physical blowing agents such as volatile liquids or gases, under temperature and present conditions which will prevent them from expanding the resin; and (b) high enough temperature of the mixture so that frictional heat generated in forcing the mixture through the restricted cross section passageway will raise the resin mixture to the predetermined foaming temperature.

The second of the two factors is that of raising the temperature of the mixture with extreme rapidity to the predetermined temperature at which the mixture will foam effectively by forcing the mixture through a restricted cross section passageway at a rate coordinated with the dimensions of the passageway and the initial temperature of the mixture to provide the controlled increment of heat.

As discussed below, the values of the dimensions of the passageway and the rate of flow to generate this predetermined increment of heat may be calculated using the formula:

$$\Delta T = \frac{(3\bar{n}+1)^2}{\bar{n}(\bar{n}+1)} \frac{L\eta Q}{\pi R^4 \rho C_v}$$

where $\Delta T$ is the temperature rise
$n$ is the average flow index
$L$ is the length of the channel
$R$ is the radius of the channel
$\eta$ is the average apparent melt viscosity of the material Q is the volumetric flow rate
ρ is the density of the melted material
$C_v$ is the specific heat at constant volume of the material With chemical blowing agents, there is a determinable time delay which may be of the order of one to six seconds after the agent has reached foaming temperature before substantial evolution of gas. The relation between time and extent of evolution of gas from chemical blowing agents has been determined for a number of blowing agents and these results plotted in curves as shown in the "SPE Journal" article (supra), the "Encyclopedia of Polymer Science" (supra) and the "Plastics Progress" article (supra).

The time delay or induction period of a chemical blowing agent is of advantage in that the rapidity to which the agents are brought to foaming temperature makes it possible to fill a mold with molding composition before substantial foaming has occurred so that superior surface character is obtained. As noted in the "SPE Journal" article (supra) at page 80, the faster the temperature rise, the higher the temperature reached before major gas evolution.

To take advantage of the special action secured by the present invention, a further factor is the curve devolped by plotting decomposition rate of the blowing agent against temperature. Typical curves are shown for azodicarbonamide and azoisobutyric amide-oxime on pages 71 to 72 of the "Plastics Progress" article (supra). Desirably, the blowing agent will be selected such that the time-temperature on completion of plastication is below that at which the selected agent decomposes to generate undesired amounts of gas in the time it is subject to that temperature, while the temperature reached through heat generated in the restricted cross section passageway will be such that the blowing agent develops gas at a high rate. For example, when molding impact styrene, while has a recommended processing temperature of 176°–315° C. which is reached by plasticating to form a resin-blowing agent mixture, large particle size azodicarbonamide will be the preferred blowing agent since at the temperature of 185° C., the decomposition rate is low and at the temperature of 210° C. reached after passing through the channel the rate of gas evolution is high.

With physical blowing agents such as volatile liquids, a comparable delay in blowing action is likewise obtainable with the rapid controllable heating secured according to the present invention. Thus, under appropriate temperature and pressure conditions, volatile liquid blowing agents may be kept liquid and in turn this liquid may remain in dispersed form or may dissolve in the molten resin. It is preferred that the liquid blowing agent be selected such that its critical temperature is above the temperature of the mixture in the plasticator and below the temperature to which the mixture is raised by passing through the restricted cross section passageway. This is important since if the temperature of the mixture entering the mold were below the critical temperature, the liquid might remain in liquid state under the pressure conditions existing in the mold. Volatile liquids useful as physical blowing agents include the chloro-fluorinated hydrocarbons, hydrocarbons and any other volatile compounds which will withstand process temperatures without degradation and which will possess a suitable critical temperature. The following are suitable chemical compounds with the critical temperatures listed in parentheses. Trichloromonofluoromethane (388° F.), trichlorotrifluoroethane (417° F.), dichlorotetrafluoroethane (294° F.), dichlorodifluoromethane (234° F.), trichloropentafluoropropane (448° F.), pentane (386° F.) and other aliphatic hydrocarbons. Blowing agents which remain as gases at the temperature and pressure existing before the injection step may in some instances such as, for example, nitrogen, ammonia, carbon dioxide and others, dissolve at least to some extent in the molten polymer resin. These liquid and gasous blowing agents in solution go through the stage of supersaturation when the temperature is raised by forcing the mixture through the restricted cross section passageway before development of bubbles and the delay while they are passing through this stage is made use of according to the present invention since the extremely rapid heating caused by passage through the restricted cross section passageway enables the mold to be filled during this stage before substantial foaming of the resin.

The temperature reached in plastication of the resin is determined by the need to make the resin injectable with the equipment used and by the factor that the temperature must be high enough so that the heat needed to bring the resin-blowing agent mixture to foaming temperature can be added by flow through a restricted cross section passageway within the capacity of the equipment used.

The amount of heat, or expressed otherwise, the temperature rise $\Delta T$ which is added to bring the resin mixture from plastication temperature to foaming temperature is given by the formula:

$$\Delta T = \frac{(3\bar{n}+1)^2}{\bar{n}(\bar{n}+1)} \cdot \frac{L\bar{\eta}Q}{\pi R^4 \rho c_v}$$

In the derivation of this formula, the assumption is made that temperature rise is due solely to fluid friction occurring in the nozzle itself and that all the heat so generated appears as temperature rise, no heat being transferred to or from the walls of the nozzle.

The pressure drop occurring across a nozzle may be calculated from the flow rate in accordance with the formula $$\Delta P = \frac{8L}{\pi R^4} \bar{\eta} Q$$

where $\Delta P$ is the pressure drop, R is the nozzle radius, L the nozzle length, $\eta$ is the average apparent viscosity and Q is the volumetric flow rate (this formula is Formula 5.13 on page 75 or 5.71 on page 114 of "Plastic Extrusion Technology and Theory" by Schenkel.

The apparent viscosity is obtained from rheological laboratory test data and, using curve fit techniques may be put in the formula:

$$\ln \eta = a_0 + a_1 \ln \dot{\gamma} + a_2 (\ln \dot{\gamma})^2 + a_3 T + a_4 T^2 + a_5 T \ln \dot{\gamma}$$

(see article entitled "Melting in Plasticating Extruders, Theory and Experiments," pages 1 to 21 of "Polymer Engineering and Science," July, 1967) where ln is the natural logarithm, $a_0$, $a_1$, $a_2$, $a_4$, and $a_5$ are constants, $\dot{\gamma}$ is shear rate and T is temperature.

Shear energy density =

$$\eta (\partial v_z / \partial r)^2$$

This formula is derived from simplification of the formula given at the top of page 11 of "Polymer Processing" by McKelvey.

$$\rho C_v \left( \frac{\partial T}{\partial t} + v_r \frac{\partial T}{\partial r} + \frac{v_o}{r} \frac{\partial T}{\partial o} + v_z \frac{\partial T}{\partial z} \right) =$$
$$- \left[ \frac{1}{r} \frac{\partial}{\partial r} (rq_r) + \frac{1}{r} \frac{\partial q_o}{\partial o} + \frac{\partial q_z}{\partial z} \right]$$
$$- T \left( \frac{\partial p}{\partial T} \right)_\rho \left[ \frac{1}{r} \frac{\partial}{\partial r} (rv_r) + \frac{1}{r} \frac{\partial v_o}{\partial o} + \frac{\partial v_z}{\partial z} \right]$$
$$- \left\{ \left[ \tau_{rr} \frac{\partial v_r}{\partial r} \right] + \tau_{oo} \frac{1}{r} \left( \frac{\partial v_o}{\partial o} + v_r \right) + \tau_{zz} \frac{\partial v_z}{\partial z} \right.$$
$$+ \left\{ \tau_{ro} \left[ r \frac{\partial}{\partial r} \left( \frac{v_o}{r} \right) + \frac{1}{r} \frac{\partial v_r}{\partial o} \right] + \tau_{rz} \left( \frac{\partial v_z}{\partial r} + \frac{\partial v_r}{\partial z} \right) \right.$$
$$\left. + \tau_{oz} \left( \frac{1}{r} \frac{\partial v_z}{\partial o} + \frac{\partial v_o}{\partial z} \right) \right\}$$

That is, in the above formula, the term on the left hand side of the equation is the rate of change of thermal energy. The first term on the right hand side of the equation refers to heat transfer across boundaries which we neglect by assumption on the basis that the amount of heat transferred is small relative to the total flow energy. The second term on the right hand side is a pressure-work term and is known to be negligible and is commonly disregarded. The remaining terms are shear-work terms; but the nature of the geometry of a cylindrical nozzle is such that a number of these terms are insignificant. That is, in a cylinder we have angular symmetry so that the terms for angular displacement are 0. In the terms of the equation, those terms having angled lines through them are 0 because of this factor.

Since there is very little variation with respect to the axial coordinate, terms marked with an "$x$" are negligible.

Circled terms are "normal stress" terms and are negligible. This leaves $$\tau r_z \partial v_z/\partial r$$

as the only term on the right hand side of the equation $\tau r_z$ is given on page 16 as of the same reference.

$$\tau r_z = \eta[\partial v_z/\partial r + \partial v_r/\partial z]$$

In tube flow the second term on the right hand side is always negligible with respect to the first, therefore, the right hand side of the equation from the top of page 11 of McKelvey is equal to:

$$\eta(\partial v_z/\partial r)^2$$

On the left hand side of the equation on page 11 of McKelvey, in the first term in parentheses it is assumed that there is no variation of flow with time so that this term would be dropped. The third term is dropped since there is no angular displacement, the second term is dropped because it is negligible with respect to the fourth term. $v_z$=velocity, Q is volume flow rate=velocity$\times$ cross section area, temperature increase is $\partial T$. Therefore, the equation from page 11 of McKelvey becomes:

$$\rho C_v v_z \partial T/\partial z = \eta(\partial v_z/\partial r)^2$$

If this is integrated over a nozzle channel of length L and radius R there results:

$$\rho C_v Q \Delta T = \int_0^L \int_0^R \eta(\partial v_z/\partial r)^2 2\pi r dr dL$$

$v_z$ is given by equation 3–11 on page 67 of McKelvey including substitutions of $\bar{v}_z$ from equation 3–10 and $v_0$ from 3–9 to yield:

$$v_z = \left(\frac{3n+1}{n+1}\right)\left(\frac{Q}{\pi R^2}\right)\left[1-(r/R)^{\frac{n+1}{n}}\right]$$

Differentiating the equation from line 24 of page 27 for "$v_z$" gives the expression:

$$\partial v_z/\partial r = -\left(\frac{3n+1}{n}\right)\left(\frac{Q}{\pi R^3}\right)\left(\frac{r}{R}\right)^{\frac{1}{n}}$$

Substituting this value of $$\partial v_z/\partial r$$

in the equation on line 18 gives:

$$\rho C v Q \Delta T = \int_0^L \int_0^R \eta \left[\left(\frac{3n+1}{n}\right)\left(\frac{Q}{\pi R^3}\right)\left(\frac{r}{R}\right)^{\frac{1}{n}}\right]^2 2\pi r dr dL$$

To evaluate the above double intergal, the apparent *melt viscosity* "$\eta$" and the flow index "$n$" can be evaluated at an average condition.

The equations are derived on the basis that the fluids are non-Newtonian and treated as power law fluids. The term, "average flow index" or "$\bar{n}$" refers to average value of the parameter "$n$" employed in the power law equation, see page 32 of McKelvey.

The value of the term, "$\bar{n}$" is given by the equation:

$$\bar{n} = 1 + a_1 + 2a_2 \ln \bar{\dot{\gamma}} + a_5 \bar{T}$$

This equation is derived from the equation given above for "$\ln \eta$"; namely:

$$\ln \eta = a_0 + a_1 \ln \dot{\gamma} + a_2(\ln \dot{\gamma})^2 + a_3 T + a_4 T^2 + a_5 T \ln \dot{\gamma}$$

and from the formula $$\eta = \eta^0 \left|\frac{\dot{\gamma}}{\dot{\gamma}^0}\right|^{n-1}$$

an accepted equation for the viscosity "$\eta$" of power law fluids (see page 67 of "Polymer Processing" by McKelvey).

The mathematical steps involved are as follows:
Differentiating the first of these equations gives:

$$\partial(\ln \eta) = a_1 \partial(\ln \dot{\gamma}) + 2a_2 \ln \dot{\gamma} \partial(\ln \dot{\gamma}) + a_5 T \partial(\ln \dot{\gamma})$$

which may be rearranged to give the equation:

$$\frac{\partial(\ln \eta)}{\partial(\ln \dot{\gamma})} = a_1 + 2a_2 \ln \dot{\gamma} + a_5 T$$

In the second equation, $$\eta = \eta^0 \left|\frac{\dot{\gamma}}{\dot{\gamma}^0}\right|^{n-1}$$

"$\eta^0$" and "$\dot{\gamma}^0$" are constants and $$\left|\frac{\dot{\gamma}}{\dot{\gamma}^0}\right|^{n-1}$$

is a constant of proportionality. The equation may therefore be written as:

$$\eta = \left(\frac{\eta^0}{|\dot{\gamma}^0|^{n-1}}\right) \cdot |\dot{\gamma}|^{n-1}$$

For convenience, the quantity in the bracket being a constant may be replaced by a capital "K" and the natural log of this equation will be:

$$\ln \eta = \ln K + (n-1) \ln \dot{\gamma}$$

Differentiating this equation gives:

$$\partial(\ln \eta) = (n-1)\partial(\ln \dot{\gamma})$$

Rearranging this gives:

$$\frac{\partial(\ln \eta)}{\partial(\ln \dot{\gamma})} = n - 1$$

Substituting this value of $$\frac{\partial(\ln \eta)}{\partial(\ln \dot{\gamma})}$$

in the equation derived above gives:

$$n - 1 = a_1 + 2a_2 \ln \dot{\gamma} + a_5 T$$

or $$n = 1 + a_1 + 2a_2 \ln \dot{\gamma} + a_5 T$$

The equation, as developed, applies generally to give the value of "$n$" as a function of "$\dot{\gamma}$" and "$T$" and insertion of values of "$\dot{\gamma}$" and "$T$" will give a value for "$n$." The average flow index "$\bar{n}$" is determined by evaluating the flow index under some average conditions, i.e. average shear rate "$\bar{\dot{\gamma}}$" and average temperature "$\bar{T}$." Accordingly, insertion of the average values "$\bar{\dot{\gamma}}$" and "$\bar{T}$" in the above equation gives the average flow index "$\bar{n}$" and the equation becomes:

$$\bar{n} = 1 + a_1 + 2a_2 \ln \bar{\dot{\gamma}} + a_5 \bar{T}$$

In this equation "$\bar{T}$" is the average plastic melt temperature which may be expressly measured and the coefficients, "$a_1$," "$a_2$" and "$a_5$" are those used in the equation for apparent viscosity hereinabove.

The average shear rate, "$\bar{\dot{\gamma}}$" is derived as follows:
"$\bar{\dot{\gamma}}$" is defined as:

$$\partial v_z/\partial r \text{ or } \bar{\dot{\gamma}} = \overline{\partial v_z/\partial r}$$

and may be written as:

$$\bar{\dot{\gamma}} = -2\left(\frac{3\bar{n}+1}{2\bar{n}+1}\right)\left(\frac{Q}{\pi R^3}\right)$$

Thus, "$\bar{n}$" and "$\bar{\eta}$" replace "$n$" and "$\eta$" respectively, the former being functions of "$\bar{\gamma}$" and "$\bar{T}$" only and not of "$r$" and "$L$" explicitly. The double integral may now be readily integrated.

Substituting "$\bar{n}$" and "$\bar{\eta}$," the double integral equation becomes:

$$\rho C_v Q \Delta T = \int_0^L \int_0^R \bar{\eta} \left[\left(\frac{3\bar{n}+1}{\bar{n}}\right)\left(\frac{Q}{\pi R^3}\right)\left(\frac{r}{R}\right)^{\frac{1}{n}}\right]^2 2\pi r \, dr \, dL$$

Removing constants and integrating with respect to "$L$":

$$\rho C_v Q \Delta T = \bar{\eta} \left(\frac{3\bar{n}+1}{\bar{n}}\right)^2 \left(\frac{Q}{\pi R^3}\right)^2 (2\pi L) \int_0^R \left(\frac{r}{R}\right)^{\frac{2}{n}} r \, dr$$

Evaluating:

$$\int_0^R \left(\frac{r}{R}\right)^{\frac{2}{n}} r \, dr = R^2 \int_0^1 \left(\frac{r}{R}\right)^{\frac{2}{n}+1} d\left(\frac{r}{R}\right) = \frac{\bar{n} R^2}{2\bar{n}+2}$$

Therefore $$\rho C_v Q \Delta T = \bar{\eta} \left(\frac{3\bar{n}+1}{\bar{n}}\right)^2 \left(\frac{Q}{\pi R^3}\right)^2 (2\pi L) \left(\frac{\bar{n} R^2}{2\bar{n}+2}\right)$$

$$= \frac{(3\bar{n}+1)^2}{\bar{n}(\bar{n}+1)} \frac{\bar{\eta} Q^2 L}{\pi R^4}$$

$$\Delta T = \frac{(3\bar{n}+1)^2}{\bar{n}(\bar{n}+1)} \frac{\bar{\eta} Q L}{\rho C_v \pi R^4}$$

This may be written in terms of pressure drop, "$\Delta P$," across the flow channel rather than flow rate "$Q$" by substituting the value $$\bar{\eta} Q = \frac{\pi R^4 \Delta P}{8L}$$

which is taken from the earlier equation $$\Delta P = \frac{8L\bar{\eta}Q}{\pi R^4}$$

to give the equation:

$$\Delta T = \frac{(3\bar{n}+1)^2}{\bar{n}(\bar{n}+1)} \frac{\Delta P}{8\rho C_v}$$

or $$\Delta P = \frac{\bar{n}(\bar{n}+1)}{(3\bar{n}+1)^2} 8\rho C_v \cdot \Delta T$$

This formula provides a useful indication of the temperature rise secured in forcing the plastic material through the restricted cross section passageway, but the actual temperature rise may be somewhat less because of energy balance factors disregarded in simplification of the formula.

The experimentally determined temperature rise through forcing a plasticated resin-blowing agent mixture through a restricted cross section passageway was compared with temperature rise calculated from the simplified formula in the following test. A series of molding operations were carried out in which plasticated impact polystyrene-blowing agent mixture was injected into a mold using different diameter restricted cross section passageways, different pressure drops across the passageways and different injection rates. In the tests the impact polystyrene had a melt density of 63 lbs. per cubic feet and a specific heat of 0.55 B.t.u./lb. °F. and was mixed with 0.5% by weight of azodicarbonamide based on the weight of the polystyrene. The mixture was plasticated in a reciprocating screw injection molding machine. The experimentally determined results are listed in the following table along with the corresponding values determined by calculation. It will be noted that in the test in which the temperature rise was the greatest, there is a difference between the calculated and the experimentally determined values which is due to the fact that the formula does not account for th total enery balance, particularly loss of heat across boundaries. The listed conditions and temperature rise values are not intended as foam molding process guide lines, but only as illustrative of the relation of calculated temperature rise to observe temperature rise.

| | | Experimental | | | | Calculated values | | | | |
|---|---|---|---|---|---|---|---|---|---|---|
| Condition | Passageway nozzle .75" long, diameter | $\Delta P$, p.s.i. | Q, lbs./sec. | T in °F. | $\Delta T$, °F. | $\bar{\eta}$ lbs. sec./in.$^2$ | $\bar{\gamma}$, sec.$^{-1}$ | $\bar{n}$ | Shear work, in./lbs./sec. | $\Delta T$, °F. |
| Number 1 | .093 | 8,000 | .272 | 412 | 30 | .00262 | 15.490 | .142 | 93,650 | 67.1 |
| Number 2 | .250 | 1,280 | .272 | 421 | 7 | .02193 | 923.2 | .289 | 11,170 | 8.0 |
| Number 3 | .250 | 2,560 | .544 | 412 | 16 | .02193 | 1.069 | .270 | 45,620 | 16.3 |

The following examples are given as assistance in understanding the invention:

Example 1

Using general purpose polypropylene having a density of .902 g./cc. and a Vicat softening point of 305° F., the polypropylene being in pellet form and dusted with 0.7% by weight of azodicarbonamide based on the polypropylene, the mixture was melted in an injection molding plasticator at a barrel temperature of 350° F. and a pressure of 980 p.s.i. so that it was maintained below the foaming temperature. The plasticated material was injected at an injection pressure of 15,000 p.s.i. through a restricted cross section passageway having a diameter of 0.125" and a length of 1". The injection time was 1.25 seconds to fill a mold cavity maintained at 20° F., the mold cavity being .312" thick, 3" wide and 10" long. The temperature of the material entering the mold after passing the restricted cross section passageway was 385° F., a temperature increase of 35° F. which brought the mixture of polypropylene and azodicarbonamide up to the foaming temperature. Upon filling the mold cavity, the mold cavity was expanded by moving a mold member at a rate of 0.24 in./sec. through a distance of 0.277". The foam slab had a thickness of 0.58" and a density of 0.477 g./cc. with excellent surface skin and uniform foam cell development.

Example 2

Using a high impact polystyrene having a density of 1.06 g./cc. and a Vicat softening point of 330° F., the polystyrene being in pellet form and dusted with 0.7% by weight of azodicarbonamide based on the polypropylene, a plasticated mix was worked up in an injection molder having a barrel temperature of 350° F. under pressure of 800 p.s.i. so that the mixture was kept below the foaming temperature. The plasticated material was injected at an injection pressure of 15,000 p.s.i. through a restricted cross section passageway having a diameter of 0.125" and a length of 1". The injection time was 1.25 seconds and the mold cavity into which it was injected was at 200° F. The mold cavity was in slab form wherein the dimension corresponding to slab thickness was .155 in. and the lateral dimensions were 3" x 10". The temperature of the material entering the mold after passing the restricted cross section passageway was 380° F., a temperature increase of 30° F. which brought the mixture up to the foaming temperature. Upon filling of the mold cavity the mold cavity was expanded by moving a mold member at a rate of .03 inch/sec. through a distance of .150 in. The foamed slab so molded had a thickness of .305 in. and a density of .54 g./cc. The molded slab had an excellent surface skin and uniform cell development.

Example 3

Using a polyethylene copolymer (Phillip 5005) having a density of .95 g./cc., a Melt Index of 0.5 and a Vicat softening point of 251° F., the polyethylene copolymer being in pellet form and dusted with 0.7% by weight of azodicarbonamide based on the copolymer polypropylene, the mixture was plasticated in an injection molding plasticator at a barrel temperature of 350° F. and pressure of 800 p.s.i. so that the mixture remained below the foaming temperature. The plasticated material was injected at an injection pressure of 15,000 p.s.i. through a restricted cross section passageway having a diameter of 0.125" and a length of 1". The injection time was 1.25 seconds and the mold cavity into which is was injected was at 175° F. The mold cavity was in slab form wherein the dimension corresponding to slab thickness was .155 in. and the lateral dimensions were 3" and 10". The temperature of the material entering the mold after passing the restricted cross section passageway was 385° F., a temperature increase of 35° F. which brought the mixture up to the foaming temperature. Upon filling of the mold cavity the mold cavity was expanded by moving a mold member at a rate of 0.058 inch/sec. through a distance of .175 in. The foamed slab so molded had a thickness of .330 in. and a density of .446 g./cc. and had fine surface skin and fine foam sole development.

Example 4

Low density polyethylene, 0.915 g./cc., granules were plasticated at 380° F. and 1,000 p.s.i. back pressure in an injection molding plasticator so that it was maintained below the foaming temperature. Trichloromonofluoromethane (critical temperature 388° F., critical pressure 635 p.s.i.) was introduced to the extent of 3% by weight based on the weight of the polyethylene to the barrel of the plasticator at the beginning of the metering section. The plasticated material was injected at an injection pressure of 15,000 p.s.i. through a restricted cross section passageway having a diameter of 0.125" and a length of 1". The injection time was 1.25 sec. and the temperature of the material entering the mold after passing the restricted cross section passageway was 405° F., a temperature rise of 25° F. which brought the mixture up to the foaming temperature. The mold cavity was in slab form where in the dimension corresponding to slab thickness was 0.150" and the lateral dimensions were 3" x 10". After filling of the mold cavity, the mold cavity was expanded by moving a mold member through a distance of 0.27" in an expansion time of 0.5 second. The foamed slab molded had a thickness of 0.42". The surface skin of the slab was superior in reproduction of the mold surface and the foam cells had excellent unity.

Example 5

For purposes of comparison of the present process with heretofore known processes, published data for the operation of an injection molding of foam as practiced in a commercial injection molding machine would involve, for a 44 pound injection shot, the following operations. Impact polystyrene plasticated in a screw-type plasticator was fed from the plasticator into an accumulator piston and thereafter forced from the accumulator through a nozzle into a mold. The nozzle diameter employed is .475".

In contrast using the present process for the same approximate shot size, a 0.250" diameter passageway 1" long as employed. In the process plasticated impact polystyrene containing 0.4% of coarse azodicarbonamide (Kempore 60/14) at a temperature of 380° F., which was below the foaming temperature, was forced under injection pressure of 15,000 p.s.i. through the restricted passageway. A temperature rise to 410° F. resulted from frictional heat developed in passage of the polystyrene through the restricted passageway. The plasticated mixture was introduced into an expanding mold with an initial thickness dimension of .30" and an expanded thickness of 0.58". The molded slab had an excellent surface skin with a creamy yellowish appearance indicative of undecomposed azodicarbonamide at the surface which had been adjacent the mold walls. The foam cells of the interior had uniform foam cell development.

Having thus described our invention, what we claim as new and desire to secure by Letters Patent of the United States is:

1. Process for molding articles of foamed material comprising forming a molten mixture of a foamable heat-softenable organic polymeric resinous material and a blowing agent in a chamber at a temperature maintained at all time below the foaming temperature of said blowing agent-polymeric material system, maintaining the mixture within the chamber at a level below said foaming temperature at all times to prevent expansion of the mixture and rapidly forcing a mass of said molten mixture from said chamber to the ingress opening of and through a flow resisting zone for discharge through an egress opening into a mold cavity, coordinating the temperature of the mixture in said chamber, the resistance to flow in said zone resulting from the length and cross sectional dimensions of said flow resisting zone and the rate of forcing said mixture through said zone to frictionally generate by viscous dissipation the controlled final increment of heat in flow of the mixture through said zone to raise the temperature of said mixture during passage through said zone from said temperature below the foaming temperature to said foaming temperature when said mixture reaches said egress opening, and to discharge said mixture from said egress opening into said mold cavity in substantially non-foamed condition and permitting the generation of gas from said blowing agent to expand said mixture in said cavity at said foaming temperature.

2. The invention according to claim 1 including the additional step of causing said mold cavity to extend after said filling of the mold cavity whereby to facilitate foaming of the mixture.

3. The invention according to claim 1 wherein the temperature of the mixture within the chamber is controlled by a heat transfer means.

4. Process for molding articles of foamed material comprising forming a molten mixture of a foamable heat-softenable organic polymeric resinous material selected from the group consisting of polyethylenes, polypropylenes, ethylene-propylene copolymers, ethylene vinyl acetate copolymers, polystyrenes including impact polystyrenes, polyamides, polyacetals, polycarbonates, polymers of vinyl chloride, copolymers, of vinyl chloride with other monomers such as vinyl acetate, cellulose resins such as ethylene cellulose styrene, copolymers of acrylonitrile, poyurethanes, natural rubbers, synthetic polymers and copolymers of rubber such as butadienestyrene and chloroprene and "A stage" phenolic resins and epoxy resins and other materials and a blowing agent in a chamber at a temperature maintained at all times below the foaming temperature of said blowing agent-polymeric material system, maintaining the mixture within the chamber at a level below said foaming temperature at all times to prevent expansion of the mixture and rapidly forcing a mass of said molten mixture from said chamber to the ingress opening of and through a flow resisting zone for discharge through an egress opening into a mold cavity, coordinating the temperature of the mixture in said chamber, the resistance to flow in said zone resulting from the length and cross sectional dimensions of said flow resisting zone and the rate of forcing said mixture through said zone to frictionally generate by viscous dissipation the controlled final increment of heat in flow of the mixture through said zone to raise the temperature of said mixture during passage through said zone from said temperature below the foaming temperature to said foaming temperature when said mixture reaches said egress opening, and to discharge said mixture from said egress opening into said mold cavity in substantially non-foamed condition and permitting the generation of gas from said blowing agent to expand said mixture in said cavity at said foaming temperature.

5. The process for molding articles of foamed material as defined in claim 1 in which said blowing agent is a chemical compound which is decomposed by heat to liberate gas for expanding the polymeric material and in which the time and temperature to which the mixture of polymeric material and blowing agent has been subjected prior to being forced through a restricted cross section zone is at a level such that the additional heat generated in passing through said restricted cross section zone brings the blowing agent to a temperature at which it decomposes to generate its gas at a high rate.

6. The process for molding articles of foamed material as defined in claim 5 in which walls of said mold are at a temperature below the decomposition temperature of said blowing agent and portions of polymeric material against said walls are cooled to a temperature at which blowing agent in said portions remains undecomposed.

7. The process for molding articles of foamed material as defined in claim 1 in which said blowing agent is a volatile liquid and in which the temperature of the mixture of polymeric material and blowing agent before passing through said zone of restricted cross section is below the critical temperature of the blowing agent and the pressure on said mixture before passing through said zone maintains said blowing agent in liquid state and said mixture is raised to a temperature above the critical temperature of the blowing agent by heat generated in passing said mixture through said zone of restricted cross section.

References Cited

UNITED STATES PATENTS

| | | | |
|---|---|---|---|
| 2,460,831 | 2/1949 | Kovacs | 264—68 UX |
| 3,674,401 | 7/1972 | Annis et al. | 264—51 UX |
| 3,697,204 | 10/1972 | Yritsis et al. | 264—48 X |

FOREIGN PATENTS

| | | | |
|---|---|---|---|
| 1,194,192 | 6/1970 | Great Britain | 264—54 |

OTHER REFERENCES

Bird, R. B. "Viscous Heat Effects in Extrusion of Molten Plastic," in SPE Journal, September 1955, pp. 35–40.

Tadmor, Zehev; Iian J. Duvdevani, Imrich Klein, Melting in Plasticating Extruders, Theory and Experiment." Reprinted from July 1967 Polymer Engineering and Science, pp. 1–12, 21.

Bernhardt, Ernest, Edt. "Processing of Thermoplastic Materials," New York, Reinhold, e1959, pp. 15–30. (SPE Plastics Engineering Series).

McKelvey, James M., "Polymer Processing," New York, John Wiley and Sons, e1962, pp. 6–12, 15, 65–69, 79–85.

PHILIP E. ANDERSON, Primary Examiner

U.S. Cl. X.R.

260—2.5 E; 264—51, 54, 68, 328, 329, DIG. 5, DIG. 16; 425—4, 242, 244, 817

PO-1050
(5/69)

UNITED STATES PATENT OFFICE
CERTIFICATE OF CORRECTION

Patent No. 3,776,989            Dated December 4, 1973

Inventor(s) Rupert E. Annis, Jr. and William T. Kyritsis

It is certified that error appears in the above-identified patent and that said Letters Patent are hereby corrected as shown below:

In the claims:

Claim 2, line 37, after to and before after, change extend to -expand-

Signed and sealed this 11th day of June 1974.

(SEAL)
Attest:

EDWARD M. FLETCHER, JR.             C. MARSHALL DANN
Attesting Officer                    Commissioner of Patents